United States Patent
Vignolle

(10) Patent No.: US 9,773,323 B2
(45) Date of Patent: Sep. 26, 2017

(54) METHOD FOR CALIBRATING A DIGITAL IMAGER

(71) Applicant: TRIXELL, Moirans (FR)

(72) Inventor: Jean-Michel Vignolle, Moirans (FR)

(73) Assignee: TRIXELL, Moirans (FR)

( * ) Notice: Subject to any disclaimer, the term of this patent is extended or adjusted under 35 U.S.C. 154(b) by 0 days.

(21) Appl. No.: 15/127,366

(22) PCT Filed: Apr. 3, 2015

(86) PCT No.: PCT/EP2015/097007
§ 371 (c)(1),
(2) Date: Sep. 19, 2016

(87) PCT Pub. No.: WO2015/155373
PCT Pub. Date: Oct. 15, 2015

(65) Prior Publication Data
US 2017/0140553 A1     May 18, 2017

(30) Foreign Application Priority Data

Apr. 11, 2014 (FR) ..................... 14 53252

(51) Int. Cl.
| | | |
|---|---|---|
| *H04N 17/00* | (2006.01) | |
| *H04N 17/02* | (2006.01) | |
| *G06T 7/80* | (2017.01) | |
| *H04N 5/217* | (2011.01) | |
| *H04N 5/32* | (2006.01) | |
| *H04N 5/365* | (2011.01) | |

(Continued)

(52) U.S. Cl.
CPC ............. *G06T 7/80* (2017.01); *H04N 5/2176* (2013.01); *H04N 5/23293* (2013.01); *H04N 5/32* (2013.01); *H04N 5/365* (2013.01); *H04N 5/367* (2013.01); *H04N 17/002* (2013.01)

(58) Field of Classification Search
CPC .... H04N 5/2176; H04N 5/23293; H04N 5/32; H04N 5/365; H04N 5/367; H04N 17/002; G06T 7/80
USPC ......... 348/187, 441; 382/289, 268, 275, 154
See application file for complete search history.

(56) References Cited

U.S. PATENT DOCUMENTS

| | | | | |
|---|---|---|---|---|
| 6,549,651 B2* | 4/2003 | Xiong | ...................... | G06K 9/32 |
| | | | | 345/629 |
| 6,816,187 B1* | 11/2004 | Iwai | ......................... | G06T 7/80 |
| | | | | 348/187 |

(Continued)

FOREIGN PATENT DOCUMENTS

FR     2 923 121 A1     5/2009

OTHER PUBLICATIONS

Chun Joo Park et al., "Defective pixel map creation based on wavelet analysis in digital radiography detectors," Nuclear Instruments & Methods in Physics Research, vol. 634, No. 1, Jan. 10, 2011, pp. 101-105, XP028146117.

*Primary Examiner* — Trang U Tran
(74) *Attorney, Agent, or Firm* — Baker & Hostetler LLP

(57) ABSTRACT

A method for calibrating a digital imager using a sequence of P input images, to which images a calibrating image is applied to obtain a sequence of P output images is provided. The calibration is performed by updating the calibrating image by estimating, in an iteration n, n being an integer higher than or equal to 1, an image representative of the calibrating image.

11 Claims, 2 Drawing Sheets

(51) Int. Cl.
*H04N 5/367* (2011.01)
*H04N 5/232* (2006.01)

(56) References Cited

U.S. PATENT DOCUMENTS

| | | | | |
|---|---|---|---|---|
| 7,424,170 | B2 * | 9/2008 | Steinberg | G06K 9/346 |
| | | | | 348/E5.081 |
| 7,623,683 | B2 * | 11/2009 | Chen | G06T 5/50 |
| | | | | 375/240.16 |
| 8,405,746 | B2 * | 3/2013 | Matsushita | H04N 5/2178 |
| | | | | 348/241 |
| 9,338,447 | B1 * | 5/2016 | Crump | G06T 7/80 |
| 2002/0031247 | A1 | 3/2002 | Matsuura et al. | |
| 2008/0278607 | A1 | 11/2008 | Zhang et al. | |

* cited by examiner

METHOD FOR CALIBRATING A DIGITAL IMAGER

CROSS-REFERENCE TO RELATED APPLICATIONS

This application is a National Stage of International patent application PCT/EP2015/097007, filed on Apr. 3, 2015, which claims priority to foreign French patent application No. FR 1453252, filed on Apr. 11, 2014, the disclosures of which are incorporated by reference in their entirety.

FIELD OF THE INVENTION

The invention relates to the field of digital imagers. It may be applied to any type of imager, especially imagers for imaging x-rays, visible light or infrared light. The invention is described here in the field of x-ray imagers by way of example and without loss of applicability to other imagery fields.

The invention relates to a method for calibrating the transfer function of the imager at various levels. Mention may for example be made of the calibration of offset, the calibration of gain and the calibration of defects and artefacts.

BACKGROUND

A digital imager is a system capable of detecting a source image and of converting said image into a matrix of numbers that is also what is called the output image. This output image is then displayed on a screen to an operator who will make decisions or perform measurements on the basis thereof, or who will simply appreciate the visual quality of the image in the case of an artistic or familial use.

In the case of x-ray imagers, a clinical image is produced by interposing a patient between an x-ray source and the imager. An image of the transmittance of the patient to x-rays is obtained. The operator is a radiologist or a radiographer.

A digital imager generally implements one or more of the following phases to generate the output image: transduction, sampling, digitization, correction and/or presentation.

The transduction is the conversion of the source image into what is called a capturable image, i.e. an image capturable by electronics: for example an image of visible photons, or an image of electrical charges. Certain imagers have no need for transduction because they can capture the source image directly (for example capture of a visible image by a CCD sensor (CCD standing for charge-coupled device)).

In the case of certain flat x-ray images, the x-ray photons from which the source image is formed are converted into visible light by a scintillator.

This electronic image is then sampled in the form of a matrix. This is what is called sampling. This sampling matrix may actually exist (case of a matrix array of TFT pixels) or may be created virtually during the process of capturing the information. Mention may be made of the case of a vacuum tube that scans a surface with an electron read beam sampled at regular time intervals.

In the case of certain flat x-ray imagers, the sampling is carried out by a matrix array of photosensitive pixels.

During the digitization, the analogue information is converted into digital information, which information is delivered by read-out electronics, and arranged into an image in accordance with the sampling matrix. This image is called the raw image. It contains dimensionless values but they are by convention considered to be expressed in LSB (acronym for least significant bit).

The raw image is not directly proportional to the source image. It must undergo a correction. It is therefore processed to make it as faithful a reproduction of the source image as possible, i.e. transformed by calculation to be directly proportional to the source image. This new image is called the clean image or even the pre-processed image. The processing operations carried out are referred to as offset correction, gain correction and defect and artefact correction. These processing operations are detailed below.

The clean image is modified to create an image better adapted to the needs of the operator, which is called the post-processed image. This is what is called the presentation step.

In the case of flat x-ray imagers for radiography, the presentation consists in sharpening outlines, compressing dynamic range (logarithmic scale), and level inversion (to make the image resemble a conventional radiograph as it would appear on an x-ray film). Other modalities (fluoroscopy for example) apply different processing operations.

The raw image will be called A. If each pixel of the matrix is being referred to, $A_{ij}$ is spoken of, the suffix ij corresponding to the pixel of row coordinate i and of column coordinate j. The source image will be called S, and by the same convention, $S_{ij}$ is spoken of. Generally, these two images are related pixel to pixel by the following formula:

$$A_{ij} = S_{ij} \times G_{ij} + OF_{ij} \quad (1)$$

This formula is true for any digital imager, at least in a certain range of values of $S_{ij}$, and for most of the pixels thereof. This range is called the range of linearity of the imager. G and OF are respectively called the gain and offset of the imager.

The first step of the correctional processing operations is the correction of offset. The result of correcting the offset in A is an image called A_Oc. The calculation carried out is:

$$A\_Oc_{ij} = A_{ij} - OF\_REF_{ij} \quad (2)$$

The image OF_REF is called the offset reference. This image must be measured for each detector by the user of the digital imagery system, with what is called an offset calibration procedure. The offset reference may initially be measured by acquiring dark images.

In the field of x-ray imagers, a dark image is produced without exposure to x-rays. To determine the offset reference, a dark image, or a plurality of dark images that are averaged in order to minimize the residual noise in the reference offset image, is or are produced. This procedure is carried out either some time (i.e. a few minutes or a few hours) before the x-ray imager is used in clinical service, or just before or just after the acquisition of a clinical image. During the implementation of this procedure, the detector is not available for acquiring clinical images.

By inserting equation (1) into equation (2), the following is obtained:

$$A\_Oc_{ij} = S_{ij} \times G_{ij} + (OF_{ij} - OF\_REF_{ij}) \quad (3)$$

If the offset calibration has been carried out correctly, then:

$$(OF_{ij} - OF\_REF_{ij}) \sim 0, \quad (4)$$

where "~" means "approximately equal to", and therefore:

$$A\_Oc_{ij} = S_{ij} \times G_{ij} \quad (5)$$

At this stage, the image A_Oc corrected for offset is obtained.

The following step is the correction of gain. The result of correction of the gain of A_Oc is an image called A_OcGc. The calculation carried out is:

$$A\_OcGcij = A\_Ocij / G\_REFij \qquad (6)$$

The image G_REF is called the gain reference. This image must be measured for each detector by the user of the digital imagery system, using what is called a gain calibration procedure. To determine the gain image, a plurality of white images corrected for offset are produced and the gain image is calculated by taking the average of these images. The aim of this averaging is to minimize the residual noise in the gain image. In the field of x-ray imagers, white images are produced by exposing the imager to x-rays without interposing either a patient or an object between the imager and the radiation source. This procedure is carried out some time (minutes, hours, days or years) before the x-ray imager is used in clinical service and requires the detector to be taken out of service for as long as the calibration takes.

By inserting equation (5) into equation (6), the following is obtained:

$$A\_OcGcij = Sij \times Gij / G\_REFij \qquad (7)$$

If the gain calibration has been carried out correctly, then:

$$Gij / G\_REFij \sim k \qquad (8)$$

where k is a constant that is identical for all the pixels of the image; and therefore:

$$A\_OcGcij = Sij \times k \qquad (9)$$

The image A_OcGc corrected for offset and gain is therefore a faithful reproduction of the image S, i.e. is equal to S, to within a factor k.

Certain pixels of the imager do not satisfy formula (1) and after step (9) have a value that is not a faithful reproduction of S. If the deviation is excessively large, these pixels are considered to be defective, and it is chosen to replace their value with another value. This calculation is what is called defect correction. For example, the defect correction may consist in replacing the value of the defective pixel with the average of the 4 or 8 nearest non-defective neighbors. The defect correction is in general carried out after the offset and gain correction, on the image A_OcGc, and the resulting image is called A_OcGcDc.

To carry out the defect correction, it is necessary to know the list of defective pixels. The procedure, the aim of which is to determine the list of defective pixels, is called the defect calibration. It is for example possible to search, in the images OF_REF or G_REF, for pixels having an atypical value, and to decide that these pixels are defective. In the case of x-ray imagers, this procedure is carried out some time (minutes, hours, days or years) before the x-ray imager is used in clinical service and requires the detector to be taken out of service for as long as the calibration takes.

The list of defects may be stored in an image called DM_REF, the pixels of which are assigned a value of 0 when they are defective and a value of 1 otherwise.

Certain pixels of the imager do not satisfy formula (1) and after step (9) have a value that is not a faithful reproduction of S. However, the deviation is sufficiently small for them not to be considered to be defective. These pixels or groups of pixels however generate an infidelity that may be seen in the image: artefacts are then spoken of. Artefacts may take various forms and be of various amplitudes, for example an artefact may be a row that is slightly whiter than the others.

When these artefacts are known and have a sufficiently predictable and specific behavior, it is possible to remove them from the image by calculation, without degrading the fidelity to the source image. This operation is called artefact correction. In contrast to defect correction, artefact correction may be carried out at any stage of the correction, i.e. on image A or A_Oc or A_OcGc or A_OcGcDc. The most suitable step is chosen, depending on the artefact generation process. For example, an additive artefact is corrected in image A_Oc and a multiplicative artefact is corrected in image A_OcGc or A_OcGcDc.

To correct artefacts it is necessary to determine their number, position and amplitude. This is done in a procedure called artefact calibration. The calibration of an artefact often consists in placing the imager under specific conditions that make the artefact and no other effects appear, in order to obtain a reference image A_REFij for the artefact.

In the field of x-ray images, an exemplary artefact is pixelization with temperature, for which patent FR0707563 has been granted. This artefact is a local drift in gain that depends on temperature and that cannot therefore be captured in the image G_REFij, which is produced at a single temperature. The patent describes a method for measuring two gain references at two different temperatures, thereby allowing the calculation of a gain correction to be applied to the affected zones only, on the basis of a temperature delivered by a temperature sensor integrated into the imager. This gain correction is different for each pixel, thereby causing it to take the form of a image A_REFij of sensitivity to temperature. This procedure is carried out some time (minutes, hours, days or years) before the x-ray imager is used in clinical service and requires the detector to be taken out of service for as long as the calibration takes.

As was seen above, the corrections require calibrations. These calibrations consist in producing reference images, OF_REF, G_REF, DM_REF or A_REF, that are generically called C_REF below. The calibration procedures pose a number of problems.

They take the imager out of service for as long as they take. Specifically, calibration procedures in general require images to be produced under very controlled conditions, without disruption, this being incompatible with normal use of the imager.

They may require the intervention of an operator who is specialized in the implementation of these procedures, for example because a procedure is complex or requires specific tools (calibration test patterns for example). In the case of an x-ray imager, the conventional procedure for calibrating gain requires images to be taken with x-rays, and, in this case, standards in force require a human operator to be present.

The calibration is sometimes not stable over time and may require relatively frequent recalibrations. The cause of this instability may be reversible or irreversible changes in the constituent hardware of the detector, or variations in the environment outside the detector (temperature, humidity, pressure). In the case of x-ray imagers, offset is recalibrated as often as possible, sometimes even between each clinical image. Defects may require an equally frequent or less frequent (once per year) recalibration. Gain may require recalibration several times per day or once per year. As regards artefacts, it is very different depending on the type of artefact: the frequency may vary from once per image to once per year.

These problems cause the user to incur additional costs: downtime cost and the cost of human intervention. This may lead in certain cases to the detector not being re-calibrated as often as necessary by the user, the final quality of the produced images therefore being degraded.

It would therefore be very useful to have at one's disposal a calibrating procedure not having the aforementioned drawbacks, i.e. one having the following features:

the feature of not taking the detector out of service, i.e. the feature of also being able to work with images disrupted by normal imager use;

the feature of not requiring human intervention. In the case of an x-ray imager, this in particular means carrying out the gain calibration with clinical images;

the feature of allowing very frequent recalibration: by virtue of the 2 preceding points, the cost of calibrating operations is decreased and therefore it is possible to carry out recalibrations as frequently as necessary, thereby guaranteeing the detector delivers a maximum image quality throughout its lifetime.

SUMMARY OF THE INVENTION

One subject of this invention is a novel calibrating method that has the above advantages.

Specifically, one subject of the invention is a method for calibrating a digital imager using a sequence of P input images An acquired beforehand by the imager, to which images a calibrating image C_REF is applied to obtain a sequence of P output images Yn, characterized in that the calibration is carried out by updating the calibrating image C_REF by estimating, in an iteration n, n being an integer higher than or equal to 1, an image Cn representative of the calibrating image C_REF, in that an initial image C0 representative of the calibrating image C_REF is defined, and in that the estimation of the image Cn representative of the calibrating image C_REF comprises the following steps:

- transforming the at least one P output images Yn, each transformation giving an image Zn of the transform of the output image Yn;
- estimating an image MZn representative of the transform of an image of a deviation dCn between the initial image C0 representative of the calibrating image C_REF and the calibrating image C_REF from the representative images and images of the transform of the output image of the preceding iterations;
- inversely transforming the representative image MZn to obtain the image of the deviation dCn; and
- combining the initial image C0 and the image of the deviation dCn and obtaining the image Cn representative of the calibrating image C_REF.

BRIEF DESCRIPTION OF THE DRAWINGS

The invention will be better understood and other advantages will become apparent on reading the detailed description of one embodiment that is given by way of example, which description is illustrated by the appended drawings, in which.

For the sake of clarity, the same elements have been given the same references in the various figures.

DETAILED DESCRIPTION

The principle of the method according to the invention consists in estimating, in successive iterations, an image Cn representative of a calibrating image C_REF from the current value of the calibrating image C_REF (and optionally the p preceding values) and from the current image A0 acquired by the detector in normal use (and optionally the p preceding images), this requiring no specialist intervention. The current iteration will be referenced by the index "n" in the description below. Current images will be called $A0_n$. Without loss of generality, the input images of successive iterations $A0_1$, $A0_2$, etc. may be immediately consecutive or not.

Figure 1A:
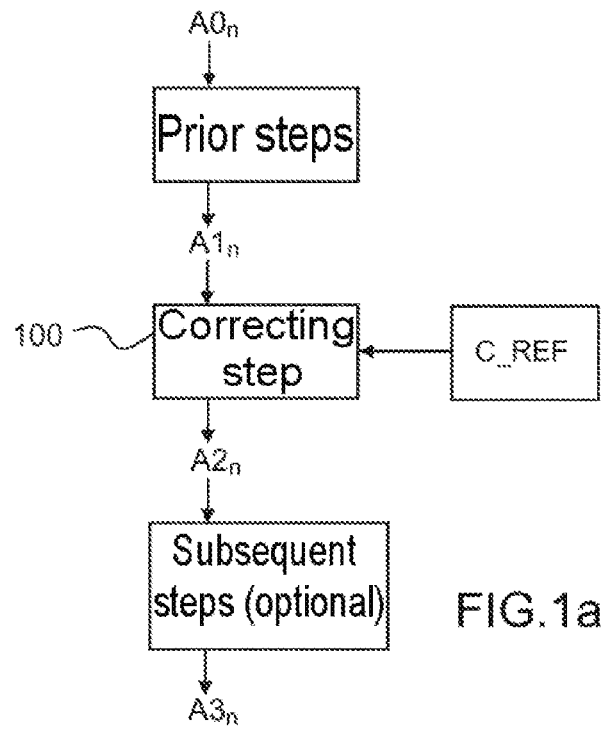
FIG. 1a illustrates a chart showing where the invention is inserted in a correcting chain, the correcting step using the reference image C_REF to pass from an image A1n to an image A2n.
Figure 1B:
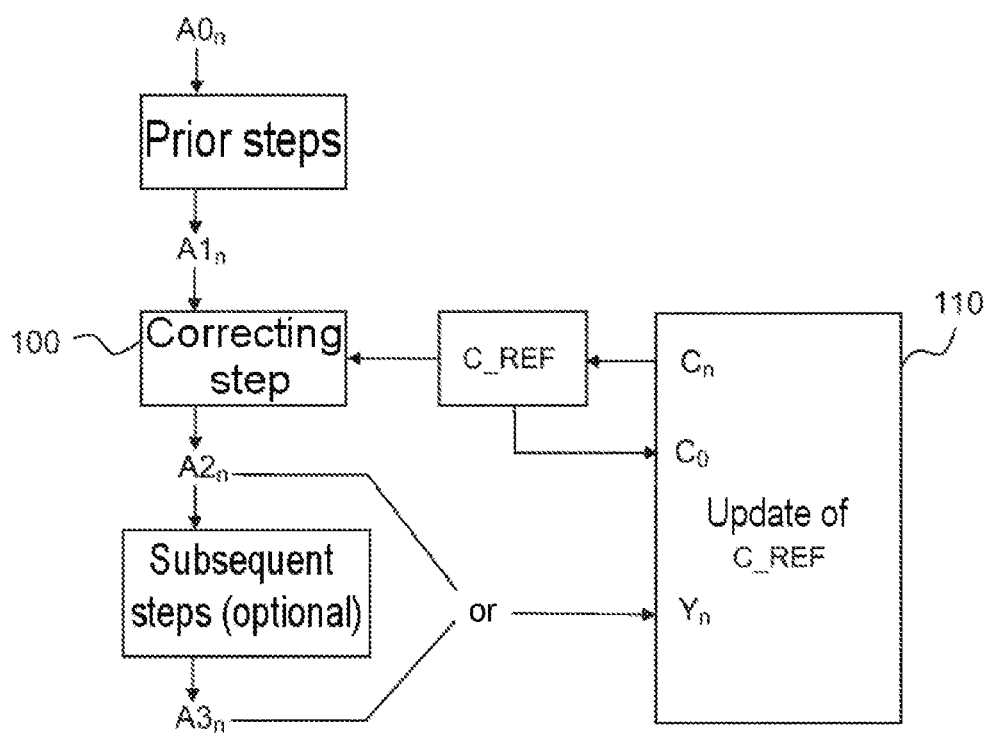
FIG. 1b shows the implementation of the invention for the correcting step shown in FIG. 1a, FIG. 2 shows details of the updating block, which allow the image Cn representative of the calibrating image C_REF to be calculated according to the invention.

FIGS. 1a and 1b show a chart illustrating where the invention is inserted in a correcting chain.

FIG. 1a shows a correcting step 100 using the calibrating image C_REF to pass from the image A1n to A2n.

FIG. 1b shows the implementation of the invention for this step 100. From a sequence of P input images An acquired beforehand by the imager, to which images a calibrating image C_REF is applied to obtain a sequence of P output images Yn, a calibration is carried out by updating (step 110) the calibrating image C_REF by estimating, in an iteration n, n being an integer higher than or equal to 1, an image Cn representative of the calibrating image C_REF.

The image A2n (or A3n, issued from prior correcting steps) is input into a block for updating C_REF, under the generic name Yn. This block will calculate a new estimation of an image representative of the calibrating image C_REF, which is called Cn. The current calibrating image C_REF may now be replaced by the image Cn. The block will also have access to the initial image C0 of the estimation of C_REF, which is available before the first iteration. This may be the result of a conventional calibration of C_REF, or an empty image (i.e. containing only an image representative of an absence of corrections).

In this description, in order not to clutter the figures and without loss of generality, only one single image Yn has been shown being input into the updating block. However it goes without saying that to carry out the estimation, a plurality of prior images A2 (or A3) could be input into this block; in this case the inputs of the block would be Yn, Yn−1, . . . Yn−p.

Likewise, Cn has been shown as immediately replacing the calibrating image C_REF, but it goes without saying that it is possible to wait a certain number of updating steps before using the image Cn.

Figure 2:
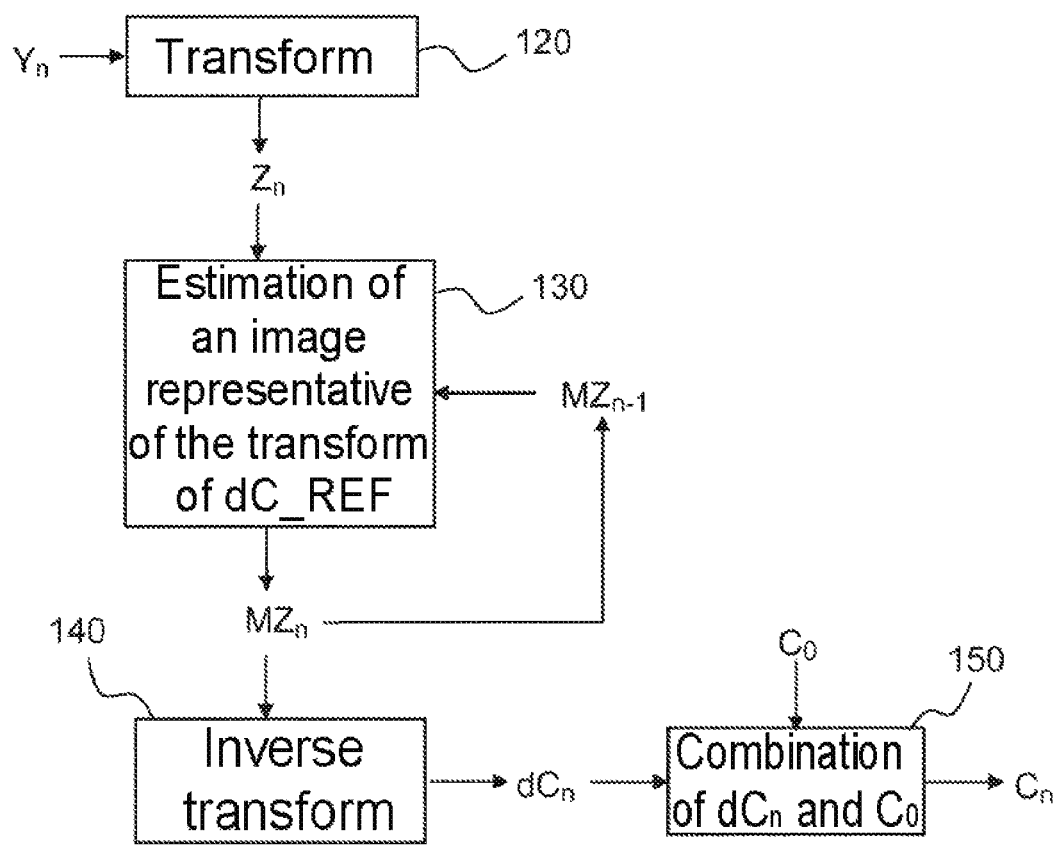

FIG. 2 shows details of the updating block (step 110), which allow the image Cn representative of the calibrating image C_REF to be calculated. An initial image C0 representative of the calibrating image C_REF is defined. The estimation of the image Cn representative of the calibrating image C_REF comprises the following steps:

- transforming the at least one P output image Yn, each transformation giving an image Zn of the transform of the output image Yn (step 120);
- estimating an image MZn representative of the transform of an image of a deviation dCn between the initial image C0 representative of the calibrating image C_REF and the calibrating image C_REF from the representative images and images of the transform of the output images of the preceding iterations (step 130);

inversely transforming the representative image MZn to obtain the image of the deviation dCn (step 140); and combining the initial image C0 and the image of the deviation dCn and obtaining the image Cn representative of the calibrating image C_REF (step 150).

In other words, the image Yn is converted into an image Zn by means of a mathematical transformation that will be described below. The image dC_REF is an image of the deviation between the initial image C0 estimated for C_REF and the actual current image of C_REF. An image representative of the transform of dC_REF is estimated from MZn−1 and Zn, using a method that will be described below. The image MZn is converted into an image dCn by means of the inverse mathematical transformation of the transformation used beforehand. The images dCn and C0 are combined into an image Cn, which is an image representative of C_REF.

In this description, in order not to clutter the figures and without loss of generality, only one single image Zn and MZn−1 has been shown being input into the estimating block. It goes without saying that p prior images Zn−1, Zn−2, . . . , Zn−p or MZn−1, MZn−2, . . . MZn−p could also be used to carry out this estimation.

For the sake of simplicity the term "transform" will be used when referring below to the block (step 120) labelled transform in FIG. 2. Likewise, the term "correction" will be used to save having to write image dC_REF. Without loss of generality, actual examples of application of the method are given below only for the estimation of the gain correction. This correction is more precisely an estimation representative of the drift in the gain reference. However "correction" will be spoken of in order not to needlessly lengthen the text.

The objective of the transform is to separate the clinical background from the correction to be estimated. The transform contains the pixel values in new dimensions that are what are called bands, by generalization of the terminology used in frequency analysis. Likewise, high-frequency or low-frequency bands are spoken of to define bands that contain details and large structures, respectively.

It is possible to class the corrections into two main types: additive corrections and multiplicative corrections. In general, for additive corrections (such as the offset correction), a transform that performs an additive decomposition is used, i.e. if the components of the decomposed image C are called Ci:

$$C=\text{sum}(Ci)$$

In this case, the background (i.e. the typical value of the images Ci) is equal to 0 in the absence of signal. This value is called the neutral value.

For multiplicative corrections (such as the gain correction) a transform that decomposes the image into multiplicative components is used, i.e.:

$$C=\text{product}(Ci)$$

In this case, the background is equal to 1 in the absence of signal and therefore the neutral value is equal to 1. However, it is possible to also use either one or combinations of the two.

In other words, the transform performs an additive or multiplicative decomposition.

Most conventional transforms perform additive decompositions. It is possible to convert them to multiplicative decompositions by various calculation methods. One possible method is conversion to logarithmic scale:

$$LC=\log(C)$$

In this case, the image LC is decomposed into additive components LCi by a conventional transform. The decomposition is therefore made multiplicative by virtue of the properties of the exponential function (denoted exp):

$$C=\exp(LC)=\exp(\text{sum}(LCi))=\text{product}(\exp(LCi))$$

The multiplicative components of the decomposition are the exp(LCi) terms.

In other words, the multiplicative decomposition transform of the image is carried out by applying a logarithmic transform to the image to obtain an image of the logarithmic transform, then by applying an additive transform to the image of the logarithmic transform.

Another possible method is the direct modification of the transform used so that it performs a multiplicative decomposition. The image comprises high frequencies and low frequencies. The multiplicative decomposition of the image is performed by separating the high frequencies HF and the low frequencies BF of the image in each step of the transform by dividing the image by the low frequencies BF to obtain the high frequencies HF. In other words, one possible implementation is, when calculating the decomposition into 2 bands, namely a low-frequency band (BF) and a high-frequency band (HF), to calculate the HF band in the following way:

$$HF=C/BF$$

Meaning that the multiplicative reconstruction is:

$$C=HF\times BF=C1\times C0$$

By proceeding in this way in all the steps of the decomposition, a multiplicative decomposition is obtained:

$$C=\text{product}(Ci)$$

Generally, the transform may be a high-pass filtering operation, a wavelet transform, a Fourier transform or a curvelet transform or a combination of these transforms or even any other transform having properties allowing the clinical background to be separated from the correction that it is desired to estimate.

The invention could also be applied with a transform called the identity transform, i.e. without transform. The drawback of the identity transform is very poor separation of the "clinical background" part from the "correction" part. If the method used to estimate an image representative of the correction is the mean, even if a very large number of images p are averaged, the residual noise remains very high in the correcting image, too high for the latter to be usable. Specifically, in a hospital that takes, for example, only pulmonary images, all the radiographs are dark at the center, behind the chest of the patient, and very light on the periphery, as there the x-rays arrive without attenuation. Averaging a large number of images creates a relatively uniform correction but representing the image of a chest of an "average patient" and this is not at all the desired effect. The procedure must capture variations attributable to the drift in the gain reference and not to the clinical background, or at the very least to a level below a visibility threshold. The visibility threshold is typically between 1% and 0.1%.

If the method is not to capture the clinical background, it is necessary to apply a transformation that will, by construction, ensure that the clinical background is typically equal to the value in the absence of clinical background. To do this, it is possible to use a transform that applies a "high-pass" filter, for example, in the case of a multiplicative decomposition, by dividing the image by a copy of itself filtered beforehand by a Gaussian filter applied to about one hundred pixels. Such a filter will effectively remove the low-frequency clinical background, the remaining portion of the clinical background being randomly higher or lower than 1 in a given pixel, and the mean being equal to 1. However, this transformation will also remove the low-frequency part of defects. The correction is therefore incomplete, because the filtering carried out is not invertible. Thus, high-amplitude defects (for example of correction 1.2) and of large size in only one direction (a group of 50 columns for example) see a substantial part of their signal removed and are therefore not corrected.

To remedy these drawbacks, it is necessary to use transforms that not only ensure that the clinical background averages to 1, but that also preserve defects, or even amplify their signal-to-noise ratio, thereby making the estimation more reliable. It is possible, for example, to use a wavelet transform. This type of transformation detects particularly well structures with horizontal or vertical edges. As calibration defects often (but not always) conform to this type of structure, they are therefore indeed captured. The clinical background is, in general, not exactly aligned with the horizontal and vertical, it is therefore better separated from any defects. Wavelet transforms also have the advantage of being very computationally inexpensive, this being important if the invention is to be implemented in a built-in electronics system. It is for example possible to use a wavelet filter from the following: Haar, Daubechies(n) where n=2 to 20, Symlet(n) where n=4 to 20, Coiflets(n) where n=6, 12, 18, 24 or 30, Battle-lemarie(n) where n=0 to 6, Bspline(m,n) where (m,n)=(1,1) to (1,5), or (2,2) to (2,8) or (3,1) to (3,9). It is also possible to use an undecimated or decimated wavelet transform of dyadic type, or a combination of both. The combination of both may consist, for example, in non-decimation of the high frequencies and decimation of the low frequencies, which is the case in each step of the transformation.

It is also possible to use a curvelet transform, which has the particularity of being optimal for estimating defects approximatable by a development limited to the second order (very rapid convergence) with few coefficients. Curvelet transforms effectively capture defects in any direction (they need not be centered on the horizontal or vertical). In addition, this type of transform is a better approximation of the operation of the human eye such as it is understood at the present time: defects most visible to the eye are therefore better captured in the correction. Its drawback is that it employs a Fourier transform, complex numbers, a redundancy of about ×7 (the transform includes about 7 times more points than the initial image, these points being complex numbers), and its relatively high computational cost: about 4 fast Fourier transforms are required for one round-trip transformation.

There are many other invertible or non-invertible spatial transformations. It is possible to use any transformation or combination or variant of transformations (for example, it is possible to choose a smooth or unsmoothed transformation, or indeed a decimated or undecimated transformation, etc.) and associated filters (such as for example a high-pass filter), provided that it at least partially isolates the clinical background from defects and ensures that, in certain of the atoms of the transform, the average of a large number of values taken by the transform is the neutral value (1 for a multiplicative decomposition, 0 for an additive decomposition) if only the clinical background is present, and equal to the transform of the defect in the contrary case.

FIG. 2 illustrates the use of a block for estimating an image representative of the transform of dC_REF.

Since this estimation is iterative, the clinical images used may or may not be successive. For example, it is possible to skip one image in n, where n=2, 3 or more, or indeed to take images at a set time; for example the first image may be taken after 10 or 30 minutes. It is also possible to restart the calculation for each set of P images, or indeed on each new image in the series (the new series will therefore have P−1 images in common with the preceding series). It is also possible to imagine a configuration in which the imager is permitted not to perform one or more updates if it is incompatible with the needs of the user. It is possible for example to encounter such a situation when the imager is not available because new images are being required. In this case, the updating calculation may either be interrupted and paused to be finished later, or it may be abandoned and restarted with a subsequent image when the processor is once more available (examination of the patient finished, for example).

The image MZn representative of the transform of the image of the deviation dCn between C0 and C_REF may be estimated in various ways, namely by means of a mean, a naïve mean, a time moving mean, a median, an iterative median, or indeed a conjoint iterative estimation of the median and deviation (also called iterative mu-sigma estimation).

The naive mean consists in calculating for each pixel the mean of the i last values, while excluding from the calculation marked values. This method has many drawbacks: it is expensive in memory, in computational resources and not very robust to clinical background.

The moving mean consists in estimating the mean from the estimation made in step (n−1), $MZ_{n-1}$, and from the current image Zn, using the following formula:

$$MZ_n = MZ_{n-1} \times (1-a) + Z_n \times a.$$

The coefficient a takes a value comprised between 0 and 1, for example a=0.001. This formula has the advantage of requiring only one image to be stored in memory, the image $MZ_{n-1}$, instead of the i last images, and only one addition to be carried out to calculate the mean. If a=0.01, this is approximately the equivalent of averaging 100 images. This technique therefore avoids having to store the last 100 images in memory and to perform 100 additions. In addition, it gives a higher weight to the most recent images. Specifically, the image (n-p) is weighted approximately by a × ((1-a)^p) and (1-a)^p tends rapidly toward 0, this being desirable if the defect varies during the estimation. This technique improves the required memory and computational power, but not the robustness to the clinical background. Specifically, it is desired to estimate defects typically of between 10% and 0.1%, and local disruptions due to the clinical background may be very substantial, for example 100%. If a clinical disruption of 100% is recorded, and a coefficient a=0.01 is used, the correction includes a disruption equal to 100%×0.01=1%, a level that is much too high to be acceptable. In addition, this disruption is visible in a number of images proportional to 1/a, i.e. 100 images. This is not a small number. It is possible to decrease this effect by decreasing the value of a, for example to a=0.001. In this case, the clinical residue will be equal to 0.1%, this possibly being visually acceptable, but it will require about 2/a images, i.e. 2000 images, to estimate the defect, which is not a small number.

There are many techniques for estimating a representative image in the presence of disruptions, a robust estimator of the mean then being spoken of. The most popular of these robust estimators is the median. Specifically, it is possible to calculate for each pixel the median of the i last images Zn. However, this requires the i last images to be stored in memory and the calculation of the median is itself an operation that is costly in computing time. Indeed, it is necessary to sort the i values of each pixel in increasing order to determine which thereof is in the middle.

To limit the computational cost and the cost in terms of memory, it is possible to use an iterative median. It is a question of comparing $MZ_{n-1}$ and $Z_n$, $MZ_{n-1}$ being the estimation of the image Z for the (n−1)th iteration:

If $Zn>MZ(n-1)$ then $MZn=Mz(n-1)+a$

If $Zn<MZ(n-1)$ then $MZn=Mz(n-1)-a$

The value of a is chosen to be low enough that the variation between two images is negligible, for example 0.01%. This estimator converges towards the median and requires no more images to be stored in memory than the moving mean. In addition, a disruption of 100% by the clinical background generates only an error of a, i.e. 0.01%. With this technique, the rate of convergence and the residual noise are easily controlled by adjusting the factor a. In this example, at least 200 images will be required to correct a defect of 2% amplitude, and 1000 images to correct a defect of 10%. The residual noise will in practice be limited to about 5 times a, 0.05% in this case. The drawback of this method is that to limit the noise to a low level (less than 1%) a low a value must be used and that a high-amplitude defect that appears abruptly is corrected slowly: 1000 images being required if the defect amplitude is 10%.

In order to remedy these drawbacks, it is possible to use an iterative conjoint technique to estimate the median and standard deviation, this technique also been called the iterative mu-sigma technique. To do this, in addition to the mean MZ, a robust standard deviation SZ is estimated in the following way:

If $Zn>MZ_{n-1}$ then $MZ_n=MZ_{n-1}+a$. (11)

If $Zn<MZ_{n-1}$ then $MZ_n=MZ_{n-1}-a$. (12)

If $|Zn-MZn|>Sz(n-1)$ then $Szn=Sz(n-1)\times b$. (13)

If $|Zn-MZn|<Sz(n-1)$ then $Szn=Sz(n-1)/b$. (14)

Lastly, $a=k\times Sz(n-1)$ where k is between 1 and 0.01, for example k=0.2 Ix' represents the absolute value of x.

One possible variant of (11)-(12) is:

If $Zn>MZ_{n-1}$ then $MZn=MZ_{n-1}\times a$,

If $Zn<MZ_{n-1}$ then $MZn=MZ_{n-1}/a$, where $a=1+k\times Sz(n-1)/MZ(n-1)$.

The value of b is set depending on the required adjustment rate, in general to between 1 and 2, for example b=1.2. This allows the standard deviation to adjust much more rapidly than the mean. Minimum and maximum values, Smax and Smin, are set to prevent the result from diverging; for example Smax=10% and Smin=0.001%. At the start, the value of S is set to S0, for example to 0.5%. This procedure makes it possible to rapidly obtain an order of magnitude of the error in each pixel. If there is no defect in the pixel, the error will be lower than the starting value and the value of Sz will rapidly converge toward the mean X noise of the image. If a visible, i.e. high-amplitude, defect is present, Sz will rapidly converge toward the value of this deviation.

As the value of a is adjusted on each image and depending on Sz, the applied correction automatically adapts as required: if a defect is present, the correction is equal to a fraction of this defect, which is rapidly corrected in a few iterations. Since the defect has disappeared, the value of the deviation will rapidly decrease to the level of the X noise of the image and the value of a is therefore well below the threshold of perception. This procedure has the advantage of providing a self-adaptation of the correction to be applied that is stable over time: when the error is great and systematic, it is corrected rapidly but when there is no error, the correction does not vary perceptibly. The price to pay for this solution is that two transforms, Mz and Sz, must be stored in memory, and a few additional calculations performed.

This describes the various methods usable to obtain in the iteration n an estimation of MZn, i.e. the image representative of the correction in the iteration n.

The new estimation of the image Cn representative of the calibrating image C_REF is calculated by inversely transforming the image MZn representative of the deviation, which gives the correcting image dCn, then by combining dCn and C0.

The method used to combine dCn and C0 depends on the how the correction was estimated. For example:

$C\_REF=C0+dCn$                 Additive combination:

$C\_REF=C0\times dCn$             Multiplicative combination:

In other words, the combination of the initial image C0 and the image dCn is an additive or multiplicative combination.

The invention claimed is:

1. A method for calibrating a digital imager using a sequence of P input images acquired beforehand by the imager, to which images a calibrating image is applied to obtain a sequence of P output images,
   wherein the calibration is carried out by updating the calibrating image by estimating, in an iteration n, n being an integer higher than or equal to 1, an image representative of the calibrating image,
   wherein an initial image representative of the calibrating image is defined,
   wherein a mathematical transformation that is able to transform an output image into an image that is what is called the transform of the output image, and for which there exists another mathematical transformation, called the inverse transformation, capable of transforming the transform of the output image into the image that is what is called the inverse transform of the transform of the output image, is chosen,
   and wherein the estimation of the image representative of the calibrating image comprises the following steps:
      transforming the at least one P output images, each transformation giving an image of the transform of the output image;
      estimating an image representative of the transform of an image of a deviation between the initial image representative of the calibrating image and the calibrating image from the representative images and images of the transform of the output image of the preceding iterations;
      inversely transforming the representative image to obtain the image of the deviation; and
      combining the initial image and the image of the deviation and obtaining the image representative of the calibrating image.

2. The calibrating method as claimed in claim 1, wherein the transform performs an additive or multiplicative decomposition of an image.

3. The calibrating method as claimed in claim 2, the transform performing a multiplicative decomposition of an image, wherein the multiplicative decomposition transform of the image is performed by applying a logarithmic transform to the image to obtain an image of the logarithmic transform, then by applying an additive transform to the image of the logarithmic transform.

4. The calibrating method as claimed in claim 2, the transform performing a multiplicative decomposition of an image, the image comprising high frequencies and low frequencies, wherein the multiplicative decomposition of the image is performed by separating the high frequencies HF and the low frequencies BF of the image in each step of the transform by dividing the image by the low frequencies BF to obtain the high frequencies HF.

5. The calibrating method as claimed in claim 1, wherein the transform is an identity transformation, a high-pass filter, a wavelet transform or a curvelet transform or a combination of these transforms.

6. The calibrating method as claimed in claim 1, wherein the image representative of the transform of the image of the deviation is estimated by means of a mean, a time moving mean, a median, an iterative median, or an iterative mu-sigma estimation.

7. The calibrating method as claimed in claim 1, wherein the image representative of the transform of the image of the deviation is estimated by means of an iterative mu-sigma estimation, in that wherein a standard deviation (Szn) is estimated and wherein the image representative of the transform of the image of the deviation is estimated from the image representative of the transform of the image of the deviation and estimation of the standard deviation of the preceding iteration.

8. The calibrating method as claimed in claim 1, wherein the combination of the initial image C0 and the image dCn is an additive or multiplicative combination.

9. The calibrating method as claimed in claim 1, wherein the image Cn representative of the calibrating image C_REF corrects offset, corrects gain, corrects artefact or is a defect map.

10. The calibrating method as claimed in claim 1, wherein it is implemented in the field of application of x-ray imagers.

11. A digital imager wherein it is configured to implement a calibrating method as claimed in claim 1.

* * * * *